(12) United States Patent
Aoyama

(10) Patent No.: US 12,531,958 B2
(45) Date of Patent: Jan. 20, 2026

(54) IMAGE FORMING APPARATUS AND CONTROL METHOD WITH USER AUTHORIZATION

(71) Applicant: TOSHIBA TEC KABUSHIKI KAISHA, Tokyo (JP)

(72) Inventor: Ryuichi Aoyama, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/644,409

(22) Filed: Apr. 24, 2024

(65) Prior Publication Data
US 2024/0333859 A1 Oct. 3, 2024

Related U.S. Application Data

(63) Continuation of application No. 18/190,904, filed on Mar. 27, 2023, now Pat. No. 12,003,687.

(51) Int. Cl.
| | | |
|---|---|---|
| H04N 1/44 | (2006.01) | |
| G06F 3/12 | (2006.01) | |
| G06F 21/36 | (2013.01) | |

(52) U.S. Cl.
CPC ......... *H04N 1/4433* (2013.01); *G06F 3/1222* (2013.01); *G06F 3/1238* (2013.01); *G06F 21/36* (2013.01)

(58) Field of Classification Search
None
See application file for complete search history.

(56) References Cited

U.S. PATENT DOCUMENTS

| | | | | |
|---|---|---|---|---|
| 2016/0055477 A1* | 2/2016 | Guérin | ................... | G07F 7/025 705/21 |
| 2016/0094754 A1* | 3/2016 | Miyazawa | ......... | H04N 1/32037 358/1.15 |

FOREIGN PATENT DOCUMENTS

| | | |
|---|---|---|
| JP | 2010-146088 A | 7/2010 |
| JP | 2017-004081 A | 1/2017 |
| JP | 2017-041090 A | 2/2017 |

OTHER PUBLICATIONS

Non-Final Office Action on U.S. Appl. No. 18/190,904 Dtd Sep. 14, 2023.
Notice of Allowance on U.S. Appl. No. 18/190,904 Dtd Jan. 24, 2024.

* cited by examiner

*Primary Examiner* — Thomas D Lee
(74) *Attorney, Agent, or Firm* — FOLEY & LARDNER LLP

(57) ABSTRACT

According to one embodiment, in a non-transitory storage medium, a computer program is recorded so that a computer of an image forming apparatus executes a code acquisition step, a transmission step, an authority setting acquisition step, and a reflection step. The code acquisition step is to acquire a code for acquiring authority setting information including execution authority indicating a function to be permitted to use among functions of the image forming apparatus. The transmission step is to transmit the acquired code to a server that issued the code. The authority setting acquisition step is to acquire the authority setting information from the server. The reflection step is to reflect the acquired authority setting information in the image forming apparatus.

17 Claims, 7 Drawing Sheets

| id | AUTHORITY | VALID PERIOD | TARGET MACHINE | DETAILED SETTING |
|---|---|---|---|---|
| 94c61320 | print | 22/07/xx-22/08/yy | mfp1 | null |
| a6408c56 | scan,copy | null | mfp2,mfp3 | null |
| ddfcae92 | print | 22/07/xx-23/01/01 | null | PRINTING OF sample.pdf only |

IMAGE FORMING APPARATUS AND CONTROL METHOD WITH USER AUTHORIZATION

CROSS-REFERENCE TO RELATED APPLICATION

This application is a continuation of U.S. application Ser. No. 18/190,904 filed Mar. 27, 2023, the entire contents of which are incorporated herein by reference.

FIELD

Embodiments described herein relate generally to a non-transitory computer readable storage medium, a control method, and an image forming apparatus.

BACKGROUND

Authentication methods for using an image forming apparatus include using a card with an IC chip and using a two-dimensional code. These methods are performed on the assumption that two or more people use two-dimensional codes in order to print the same content. In addition, these methods do not limit available image forming apparatus functions.

If the available functions cannot be limited, the image forming apparatus may be used in an unexpected manner, which is undesirable.

Provided is a technique suitable for an image forming apparatus that performs authentication when used by a user.

DETAILED DESCRIPTION

In general, according to one embodiment, in a non-transitory computer readable storage medium, a computer program is recorded so that a computer of an image forming apparatus executes a code acquisition step, a transmission step, an authority setting acquisition step, and a reflection step. The code acquisition step acquires a code for acquiring authority setting information, including execution authority, indicating a function to be permitted to use among functions of the image forming apparatus. The transmission step transmits the acquired code to a server that issued the code. The authority setting acquisition step is to acquire the authority setting information from the server. The reflection step is to reflect the acquired authority setting information in the image forming apparatus.

In the image forming apparatus of at least one embodiment, it is possible to provide a technique suitable for an image forming apparatus that performs authentication when used by a user. The image forming apparatus of the embodiment will be described in detail below.

Figure 1:
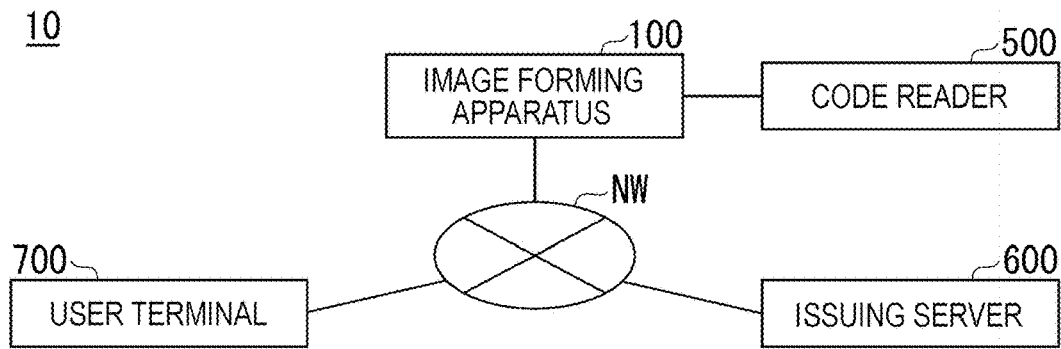
FIG. 1 is a diagram illustrating the overall configuration of an image forming system according to one embodiment.

FIG. 1 is a diagram illustrating the overall configuration of an image forming system 10 including an image forming apparatus 100 according to one embodiment.

The image forming system 10 includes the image forming apparatus 100, an issuing server 600, and a user terminal 700, which are connected via a network NW. The network NW is configured by the Internet, a mobile phone line, a LAN, and so on.

The image forming apparatus 100 is an image forming apparatus that performs authentication when used by a user. The image forming apparatus 100 is connected to a code reader 500 by, for example, a universal serial bus (USB). The code reader 500 reads a code such as a barcode and a two-dimensional code and outputs the code to the image forming apparatus 100. Although only one image forming apparatus 100 is illustrated in FIG. 1, there may be one or more image forming apparatuses 100. In addition, the code reader 500 may be incorporated in the image forming apparatus 100. Further, the code may be acquired by a scan unit (e.g., a scanner, scanning device, etc.) (described later) of the image forming apparatus 100 instead of the code reader 500.

The user terminal 700 is, for example, a smartphone or a personal computer (PC). Using the user terminal 700, a user can input authorization setting information including executing authority indicating a function is permitted to be used among the plurality of functions of the image forming apparatus 100. Although only one user terminal 700 is illustrated, the number may be one or more. The issuing server 600 is a server that issues a code for acquiring the authorization setting information.

Figure 2:
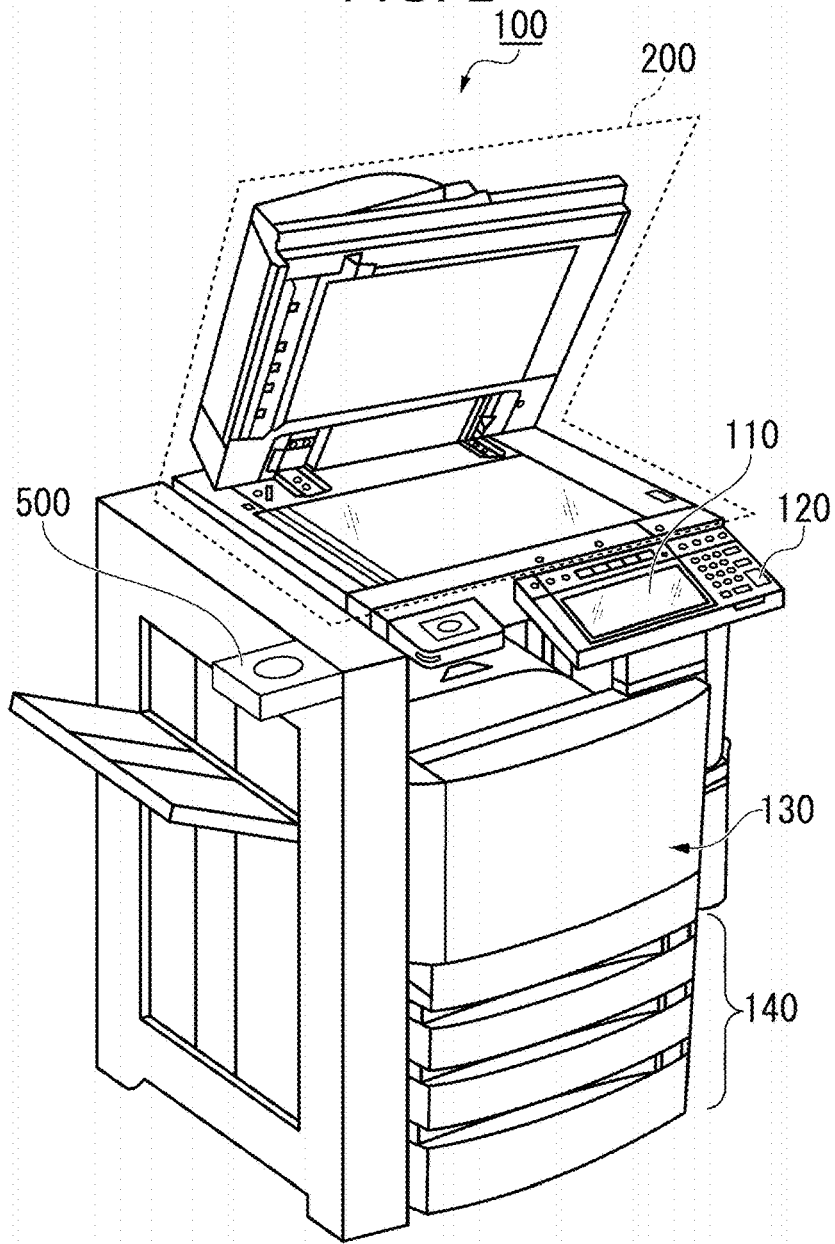
FIG. 2 is an external view illustrating an overall configuration example of an image forming apparatus according to one embodiment.
Figure 3:
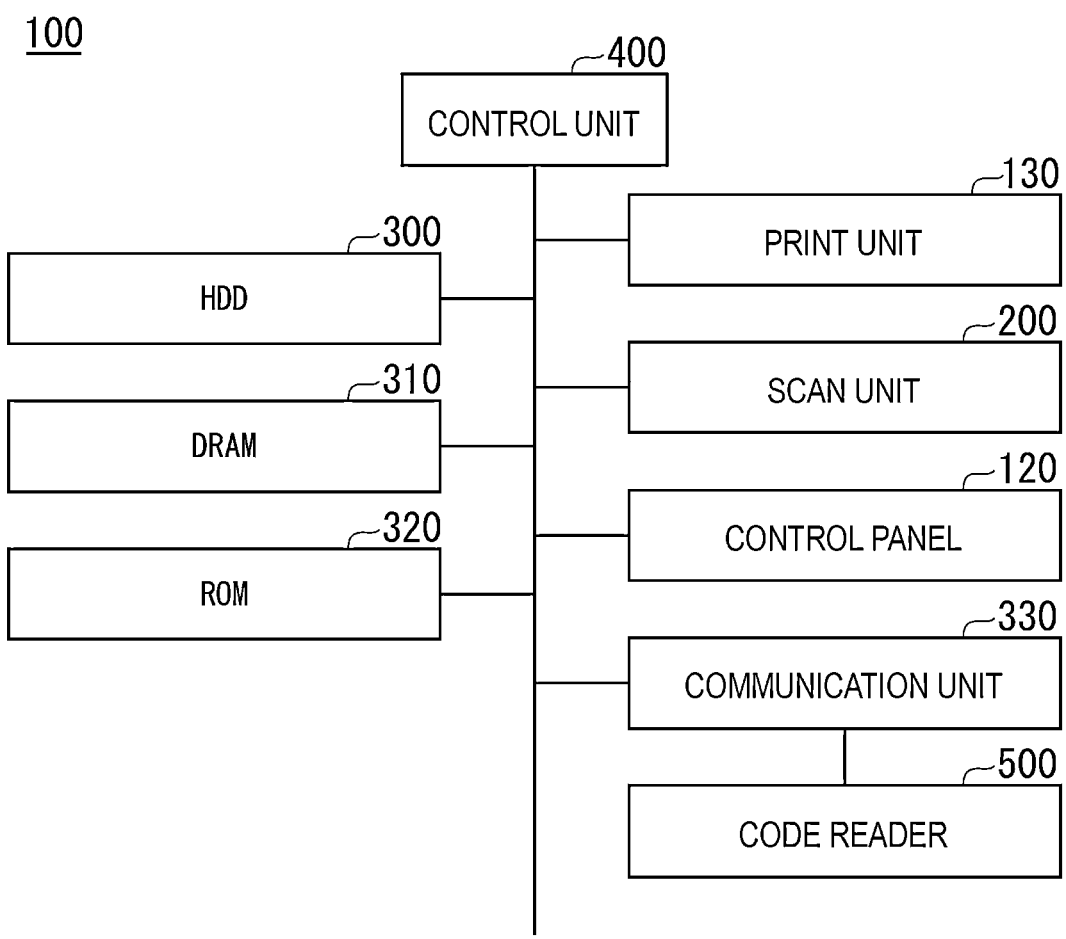
FIG. 3 is a diagram illustrating the configuration of a control system of the image forming apparatus according to one embodiment.

FIG. 2 is an external view illustrating an overall configuration according to at least one embodiment of the image forming apparatus 100. The image forming apparatus 100 may be a multifunction printer. The image forming apparatus 100 includes a display 110, a control panel 120, a print unit (e.g., a printer, printing device, etc.) 130, a sheet accommodating portion 140, and a scan unit (e.g., scanner, scanning device, etc.) 200. As illustrated in FIG. 3, the image forming apparatus 100 has a control unit (e.g., a controller) 400 that controls the entire apparatus. In addition, the image forming apparatus 100 is connected to the code reader 500 as described above.

The image forming apparatus 100 forms an image on a sheet using a developer. For example, the developer is toner. The developer is toner in the following description. The sheet is may be paper or label paper. The sheet may be any insofar as the image forming apparatus 100 is capable of forming an image on the surface thereof.

The display 110 is an image display device such as a liquid crystal display (LCD) and an organic electroluminescence (EL) display. The display 110 displays various types of information on the image forming apparatus 100. The display 110 is an example of a display unit (e.g., a displayer, a screen, etc.).

The control panel 120 has a plurality of buttons. The control panel 120 accepts user operations. The control panel 120 outputs a signal corresponding to an operation performed by a user to the control unit (e.g., controller) 400 of the image forming apparatus 100. It should be noted that the display 110 and the control panel 120 may be configured as an integrated touch panel.

The print unit (e.g., printer) 130 prints an image on a sheet based on image information generated by the scan unit (e.g., scanner) 200 or image information received via a network. The print unit (e.g., printer) 130 prints the image using toner. It should be noted that the sheet on which the image is printed may be a sheet accommodated in the sheet accommodating portion 140 or a sheet placed on a manual feed tray. The sheet accommodating portion 140 accommodates the sheet used for the image formation in the print unit (e.g., printer) 130. It should be noted that the manual feed tray is usually integrated with the housing of the image forming apparatus 100. For example, a user can use the manual feed tray by pulling the manual feed tray out of the image forming apparatus 100.

The scan unit (e.g., scanner) 200 reads image information to be read as brightness of light. The scan unit (e.g., scanner) 200 reads a sheet placed on an auto document feeder (ADF) or a sheet placed on a platen glass. The scan unit (e.g., scanner) 200 records the read image information. The recorded image information may be transmitted to another information processing device via a network. The recorded image information may be image-formed on a sheet by the print unit (e.g., printer) 130.

FIG. 3 is a diagram illustrating the configuration of the control system (e.g., controller) of the image forming apparatus 100.

The image forming apparatus 100 includes the print unit (e.g., printer) 130, the scan unit (e.g., scanner) 200, the control panel 120, a communication unit (e.g., communicator, communication device, etc.) 330, the control unit (e.g., controller) 400, a hard disk drive (HDD) 300, a dynamic random access memory (DRAM) 310, and a read only memory (ROM) 320. These units are connected via a system bus.

The control unit (e.g., controller) 400 controls each unit connected via the system bus. The ROM 320 stores various control programs necessary for the image forming apparatus 100 to operate. The ROM 320 stores programs for controlling an image forming operation and so on. Each program and data are stored in the HDD 300. Execution of the programs stored in the ROM 320 and the HDD 300 is controlled by the control unit (e.g., controller) 400. The DRAM 310 is a buffer memory that temporarily stores data generated if each program is executed.

The communication device 330 is a device group for the image forming apparatus 100 to perform communication with another device (communication using, for example, wired LAN, wireless LAN, universal serial bus (USB), or Bluetooth (registered trademark)). In particular, in the present embodiment, the communication device 330 is connected to the code reader 500.

Figure 4:
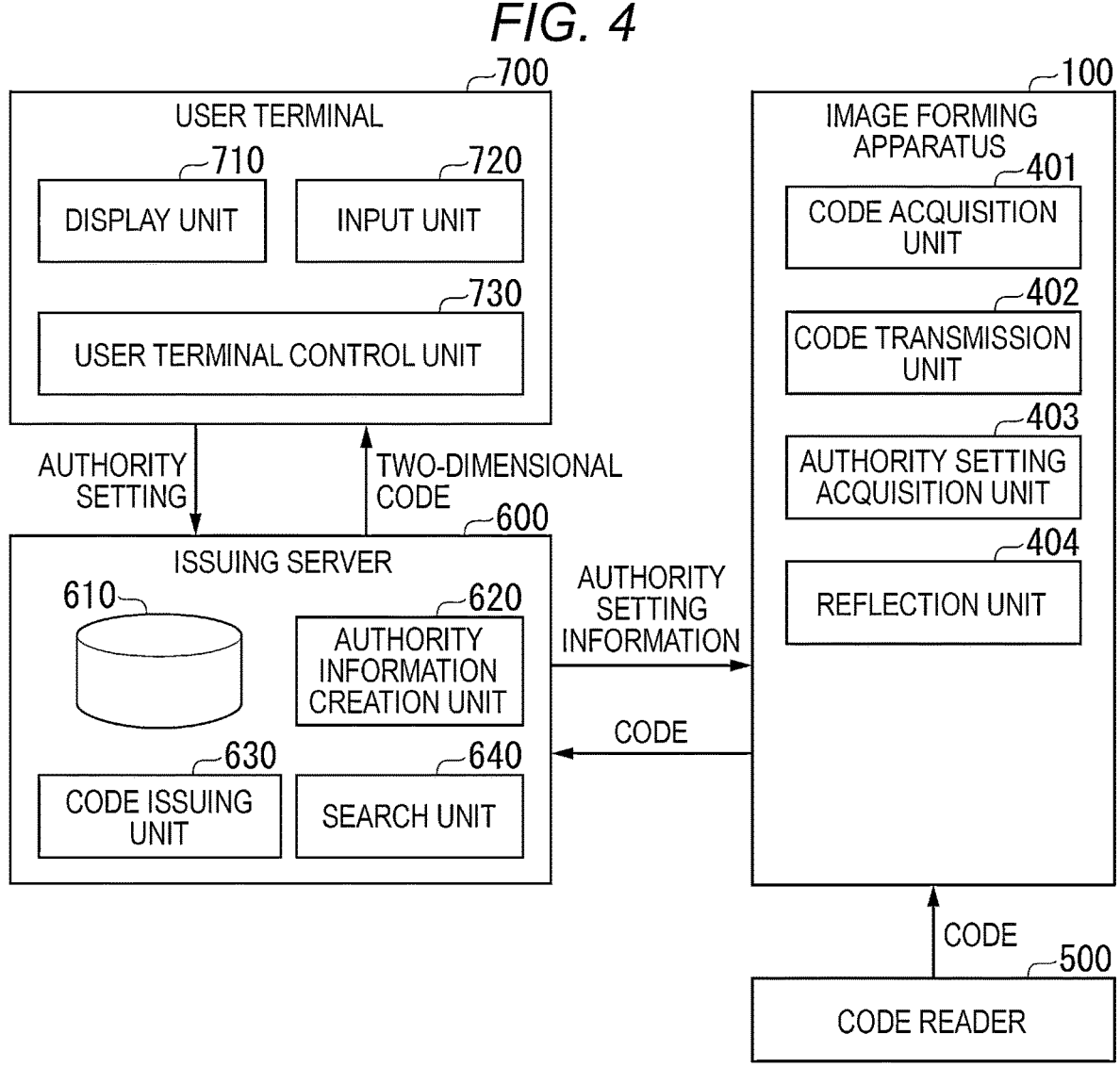
FIG. 4 is a diagram illustrating the functional configuration of the image forming apparatus according to at least one embodiment.

FIG. 4 is a diagram illustrating of the functional configuration of the image forming apparatus 100 according to at least one embodiment. FIG. 4 illustrates the functional configurations of the issuing server 600 and the user terminal 700 in addition to the functional configuration of the image forming apparatus 100. Each function illustrated in FIG. 4 is implemented by, for example, a program (e.g., software) being executed by a hardware processor such as a central processing unit (e.g., central processor) (CPU). Some or all of these components may be implemented by hardware (e.g., circuit unit: including circuitry) such as large scale integration (LSI), application specific integrated circuit (ASIC), field-programmable gate array (FPGA), and graphics processing unit (GPU) or may be implemented by software-hardware collaboration. The program may be pre-stored in a storage device (e.g., a storage device including a non-transitory computer readable storage medium) such as hard disk drive (HDD), solid state drive (SSD), and flash memory or may be stored in a removable storage medium (e.g., a non-transitory computer readable storage medium) such as DVD and CD-ROM and installed by loading the storage medium into a drive device.

The image forming apparatus 100 includes a code acquisition unit (e.g., acquirer, acquisition device, etc.) 401, a code transmission unit (e.g., transmitter) 402, an authority setting acquisition device 403, and a reflection unit (e.g., a reflector) 404. The acquisition device 401 acquires a code for acquiring the authority setting information including the executed authorization indicating a function to be permitted to use among the functions of the image forming apparatus 100. The code transmission unit (e.g., transmitter, transmission device, etc.) 402 transmits the acquired code to the issuing server 600 that issued the code. The authorization setting acquisition device 403 acquires the authorization setting information from the issuing server 600. The reflection unit (e.g., reflector) 404 reflects the acquired authorization setting information in the image forming apparatus 100.

The user terminal 700 includes a display unit (e.g., display device, display screen, etc.) 710, an input unit (e.g., input device, inputter, etc.) 720, and a user terminal control unit (e.g., controller, control device, etc.) 730. The display device 710 may be an LCD or organic EL. The input device 720 may be a touch panel or a hard key. The user terminal control device 730 is configured by an arithmetic device and a storage device and controls the user terminal 700 as a whole.

The issuing server 600 includes a database 610, an authority information creation unit (e.g., creator, creation device, etc.) 620, a code issuing unit (e.g., issuer, issuing device, etc.) 630, and a search unit (e.g., searcher) 640. The database 610 will be described later. The authority information creation unit (e.g., creator, creation device, etc.) 620 creates the authority setting information including the execution authority indicating a function to be permitted to use among the functions of the image forming apparatus in accordance with the authority setting input at the user terminal 700. The code issuing unit (e.g., issuing device, issuer, etc.) 630 issues a code indicating the created authority setting information. The search unit (e.g., searcher, etc.) 640 searches the database 610 for the code transmitted from the image forming apparatus 100 and transmits the authority setting information corresponding to the code to the image forming apparatus 100.

Figures 5, 6:
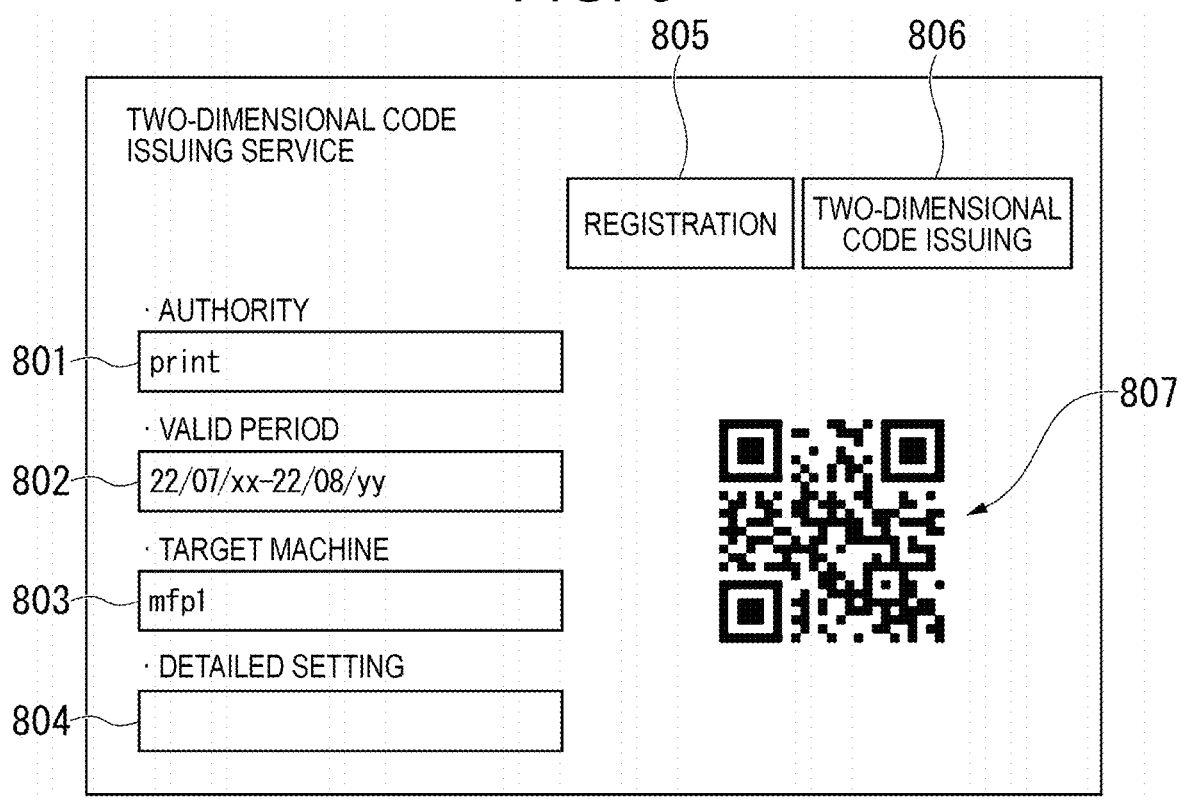
FIG. 5 is a diagram illustrating a database according to one embodiment.
FIG. 6 is a diagram illustrating an authority setting information registration screen according to one embodiment.

Next, the database 610 will be described. FIG. 5 is a diagram illustrating an example of the database 610. The database 610 is a database that stores the authority setting information. As described above, the authority setting information is information including the execution authority indicating a function to be permitted to use among the functions of the image forming apparatus 100. In the present embodiment, the authority setting information is configured by ID (e.g., identification), authority, valid period, target machine, and detailed setting.

The ID is identification information for uniquely identifying the authority setting information. The authorization indicates an available function of the image forming apparatus 100. Although the three functions of print, scan, and copy are taken as examples in the present embodiment, the authority is not limited thereto. In addition, the authority may be a plurality of functions (e.g., scan, copy, etc.) as illustrated in FIG. 5. The valid period indicates a period of time if the authorization setting information is valid. The period is indicated by "start date-end date" or null. The start or end date is indicated by yy/mm/dd. Null indicates being valid at any time.

The target machine is specific information for specifying the image forming apparatus 100 where the authority is available. The specific information is information specifying one image forming apparatus 100 such as mfp1 or is indicated by null. Null indicates being available with any image forming apparatus 100.

The detailed setting indicates more detailed settings related to the function indicated by "authority". The detailed setting is indicated by null in the absence of detailed settings. On the other hand, for example, "printing of sample.pdf only" in FIG. 5 indicates that only sample.pdf file printing is given as the authority among the print functions. This "printing of sample.pdf only" in FIG. 5 corresponds to specific file execution information that limits permission to use to processing with respect to a specific file (e.g., an identified file, a flagged files, etc.).

Additional examples of the detailed settings include "monochrome printing only", "double-sided printing", "single-sided printing", and "collective printing". The detailed setting is null in the absence of detailed settings.

The issuing server 600 issues a code obtained by encoding the above ID. The code may be of any type insofar as the ID can be encoded, and examples thereof include barcodes and two-dimensional codes. The code in the following description is a two-dimensional code as an example but is not limited thereto.

FIG. 6 is a diagram illustrating an authority setting information registration screen displayed on the user terminal 700. The authorization setting information registration screen displays an authority input field 801, a valid period input field 802, a target machine input field 803, a detailed setting input field 804, a register button 805, a two-dimensional code issue button 806, and a two-dimensional code 807.

Each input field illustrated in FIG. 6 (authorization input field 801, valid period input field 802, target machine input field 803, detailed setting input field 804) is an input field for each of the information included in the authorization setting information described above. It should be noted that the detailed setting input field 804 may be left blank without detailed setting input. Null is input in this case.

The two-dimensional code 807 is displayed in FIG. 6. The two-dimensional code 807 is displayed if a user inputs desired content in each input field and selects the two-dimensional code issue button 806. If the two-dimensional code issue button 806 is selected, the issuing server 600 generates a unique ID and issues a two-dimensional code obtained by encoding the ID. In addition, the input authorization setting information is registered in the database 610 if the register button 805 is selected by the user.

The issuing server 600 is capable of printing the issued two-dimensional code or transmitting the issued two-dimensional code to another device (e.g., smartphone, computer, tablet, etc.) by attachment to an e-mail. In addition, the two-dimensional code may be displayable at any time if the user terminal 700 is a smartphone. The paper-printed or smartphone-displayed two-dimensional code is read by the code reader 500.

Figure 7:
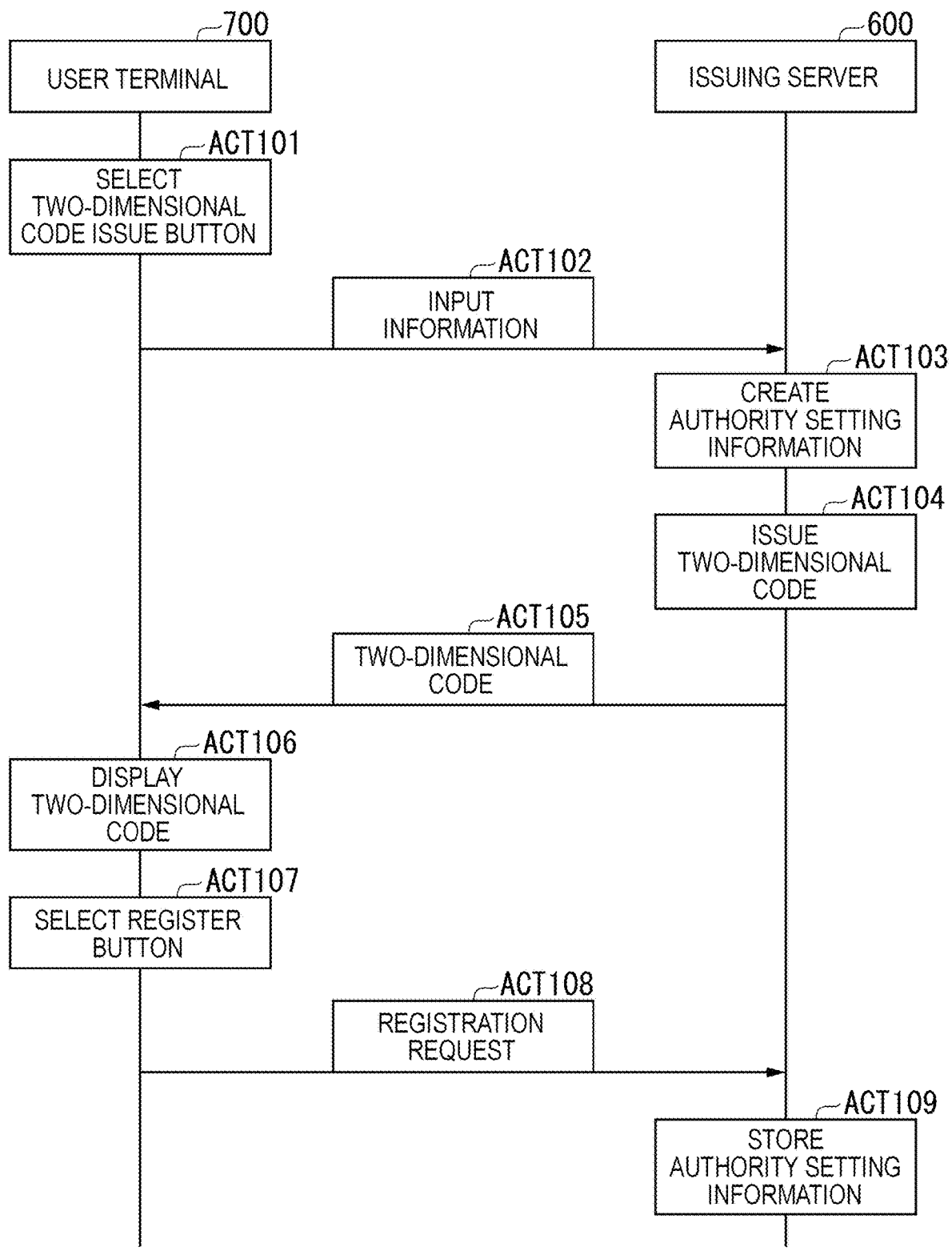
FIG. 7 is a sequence diagram illustrating the flow of processing of a user terminal and an issuing server according to one embodiment.

FIG. 7 is a sequence diagram illustrating the flow of processing of the user terminal 700 and the issuing server 600 according to one embodiment. On the user terminal 700, a user inputs desired content in each input field on the authorization setting information registration screen described above and selects the two-dimensional code issue button 806 (ACT101).

The user terminal 700 transmits the input information input in each input field to the issuing server 600 (ACT102). The issuing server 600 receives the input information and creates the authorization setting information (ACT103). At this time, the ID is also created. The issuing server 600 issues the two-dimensional code obtained by encoding the created ID (ACT104) and transmits the issued two-dimensional code to the user terminal 700 (ACT105).

The user terminal 700 displays the two-dimensional code (ACT106). If the user selects the register button 805 (ACT107), the user terminal 700 transmits a registration request to the issuing server 600 (ACT108). The issuing server 600 stores the authority setting information in the database 610 (ACT109) and ends the processing.

Figure 8:
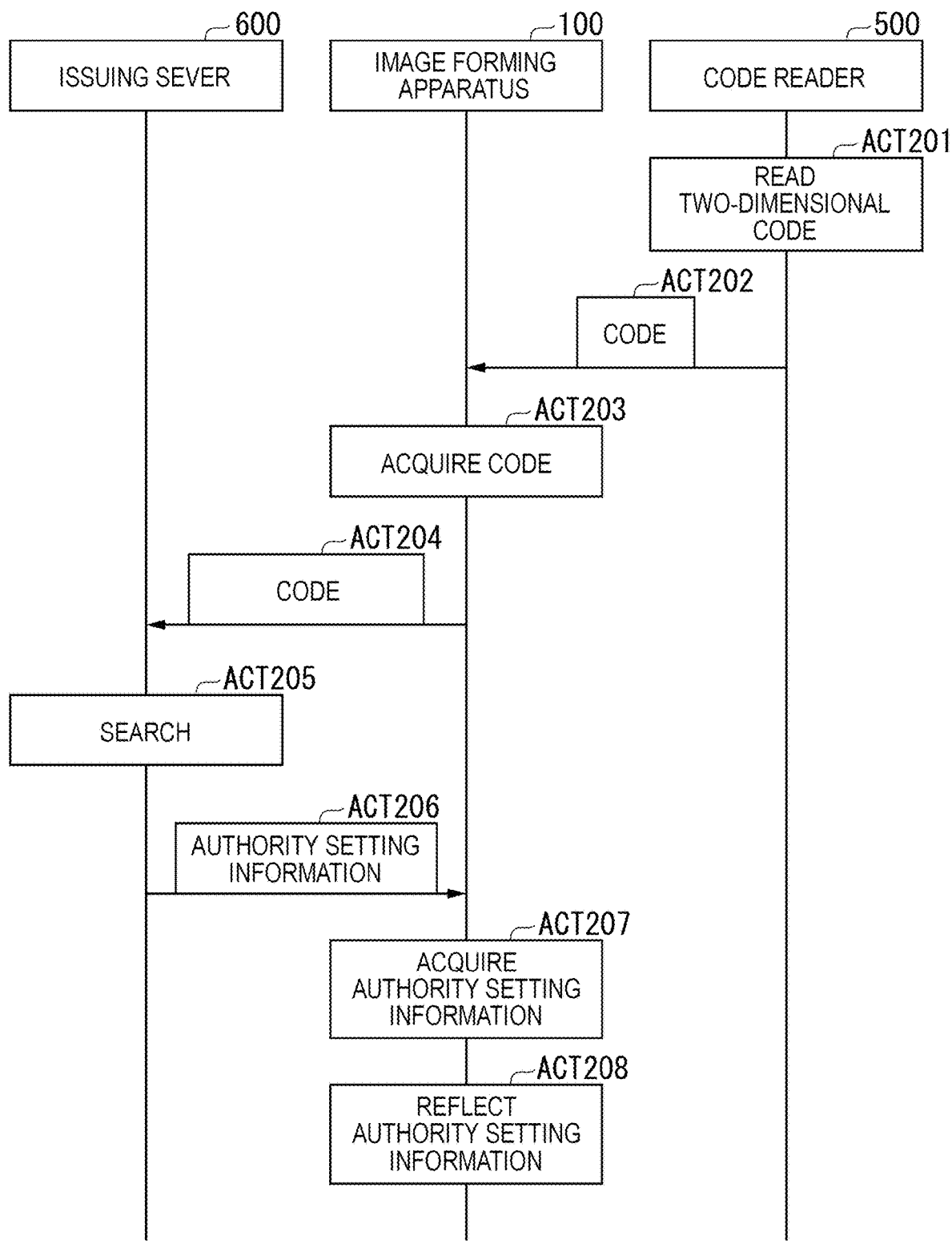
FIG. 8 is a sequence diagram illustrating the flow of processing of the issuing server, the image forming apparatus, and a code reader according to one embodiment.

FIG. 8 is a sequence diagram illustrating the flow of processing of the issuing server 600, the image forming apparatus 100, and the code reader 500 according to one embodiment. The code reader 500 reads the two-dimensional code presented by the user (ACT201) and transmits the code to the image forming apparatus 100 (ACT202). The code here is the ID decoded from the two-dimensional code.

The image forming apparatus 100 acquires the code (ID) (ACT203) and transmits the code (ID) to the issuing server 600 (ACT204). The issuing server 600 searches the database 610 with the received code (ID) (ACT205). The issuing server 600 transmits the authorization setting information corresponding to the retrieved ID to the image forming apparatus 100 (ACT206). It should be noted that in the absence of the authority setting information corresponding to the ID despite the searching, the issuing server 600 forwards the error to the image forming apparatus 100.

The image forming apparatus 100 acquires the authorization setting information (ACT207), reflects the authorization setting information (ACT208), and ends the processing. Here, the reflection of the authorization setting information means setting the image forming apparatus 100 to operate within the scope of the content indicated by the authorization setting information.

Figure 9:
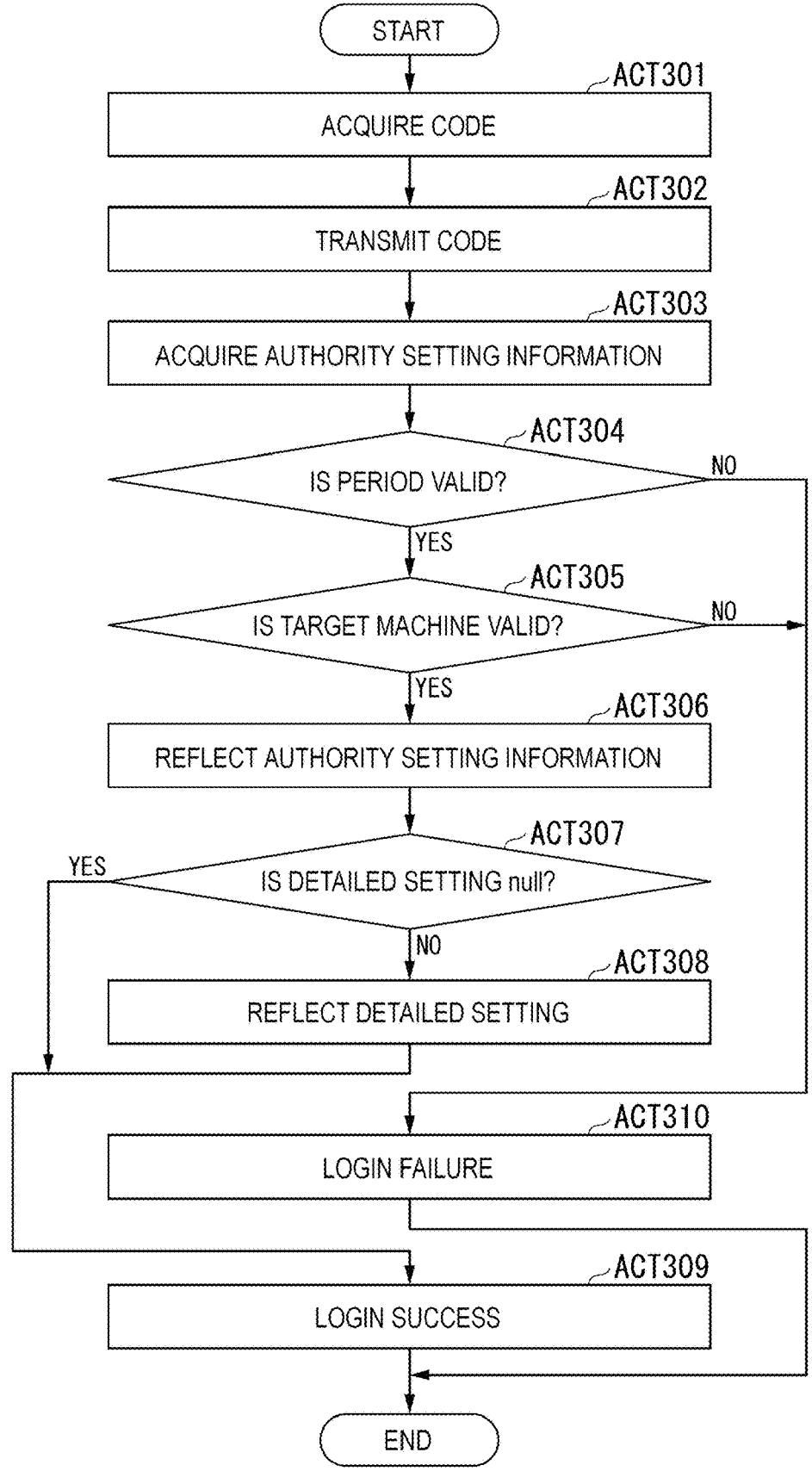
FIG. 9 is a flowchart illustrating the flow of processing of the image forming apparatus according to one embodiment.

FIG. 9 is a flowchart illustrating the flow of processing of the image forming apparatus 100 in more detail according to one embodiment. In FIG. 9, the image forming apparatus 100 acquires the code from the code reader 500 (ACT301) and transmits the acquired code to the issuing server 600 (ACT302).

If the authorization setting information is acquired from the issuing server 600 (ACT303), the image forming apparatus 100 first refers to the valid period included in the authorization setting information and determines whether the period is valid (ACT304). If the period is not valid (ACT304: NO), the image forming apparatus 100 ends the process after clearly indicating login failure to the user (ACT310), examples of which include login failure display on the display 110.

If the period is valid (ACT304: YES), the image forming apparatus 100 determines whether the target machine included in the authorization setting information indicates the image forming apparatus 100 itself. In other words, the image forming apparatus 100 determines whether the target machine is valid (ACT305). The image forming apparatus 100 proceeds to ACT310 if the target machine is not a valid machine (ACT305: NO).

If the target machine is a valid machine (ACT305: YES), the image forming apparatus 100 reflects the authorization setting information (ACT306). The image forming apparatus 100 determines whether the detailed setting is null (ACT307). If the detailed setting is not null (ACT307: NO), the image forming apparatus 100 reflects the detailed setting as well (ACT308). Next, the image forming apparatus 100 ends the process after clearly indicating login success to the user (ACT309), examples of which include login success display on the display 110. If the detailed setting is null in ACT307 (ACT307: YES), the image forming apparatus 100 proceeds to ACT309.

As described above, according to the present embodiment, it is possible to limit available functions with the authorization setting information. As a result, the possibility of use in an unexpected manner is eliminated, and thus it is possible to provide a technique suitable for an image forming apparatus 100 that performs authentication when used by a user.

In addition, in the embodiment described above, more detailed settings can be performed with the detailed setting. As a result, it is possible to minimize user operations and set authorization in accordance with a user's use case as compared with a case where only function-indicating authorization is set.

Although the image forming apparatus 100 and the issuing server 600 in the embodiment described above are separate apparatuses, processing of the issuing server 600 according to the present embodiment may be performed at the image forming apparatus 100.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method comprising:
providing, to a code reader, a code, the code reader communicably coupled to an image forming apparatus;
searching a database for a registered code corresponding to the code;
determining authorization setting information corresponding to the registered code;
transmitting the authorization setting information corresponding to the registered code to the image forming apparatus; and
operating the image forming apparatus based on the authorization setting information.

2. The method of claim 1, further comprising prior to providing the code:
causing the authorization setting information to be received by a user terminal;
creating an identification (ID) corresponding to the authorization setting information; and
registering the code, wherein the code corresponds to the ID.

3. The method of claim 2, further comprising prior to registering the code:
transmitting the code corresponding to the ID to the user terminal.

4. The method of claim 2, further comprising:
providing the code to a user by printing the code or transmitting the code to a device; and
scanning, by the code reader, the printed code or a copy of the code on the device.

5. The method of claim 2, further comprising, in response to selecting a registration button, storing the registered code corresponding to the ID in the database.

6. The method of claim 2, wherein the authorization setting information comprises at least one of an authority function, a valid period, a target machine, or detailed settings.

7. The method of claim 6, wherein the authority function indicates available functions of the image forming apparatus comprising at least one of a print function, a scan function, or a copy function.

8. The method of claim 7, wherein the detailed settings limit permission to execute at least one of the available functions.

9. The method of claim 6, wherein the valid period indicates one of a range of dates indicating a start date and an end date, or indicates a null state, wherein the null state indicates that the code is valid.

10. The method of claim 9, wherein in response to the authorization setting information comprising the valid period, the method further comprises:
determining whether the valid period is valid, the wherein the valid period is valid when a current date is between the start date and the end date; and
in response to the valid period being invalid, indicating a login failure.

11. The method of claim 10, further comprising:
in response to the valid period being valid, determining availability of the target machine; and
in response to the target machine being unavailable, indicating a login failure.

12. The method of claim 6, wherein the detailed settings comprise one of a monochrome printing only setting, a double-sided printing setting, a single-sided printing setting, and a collective printing setting.

13. A system comprising:
a user terminal communicably coupled to a server and configured to receive authorization setting information from a user, the server comprising a database, the authorization setting information comprising at least one of an authority function, a valid period, a target machine, or detailed settings, and the valid period indicating one of a range of dates indicating a start date and an end date, or a null state, wherein the null state indicates that a code is valid;
a code reader configured to read the code provided by the user;
an image forming apparatus communicably coupled to each of the code reader and the server, the image forming apparatus configured to:
receive the code from the code reader,
receive the authorization setting information corresponding to the code from the server,
operate based on the authorization setting information, and
when the valid period is invalid, indicate a login failure.

14. The system of claim 13, wherein the user terminal further comprises:

an interface configured to receive the authorization setting information from the user, and a display configured to display at least the authorization setting information.

15. The system of claim 14, wherein the user terminal is further configured to:

receive the code corresponding to the received authorization setting information; and register the code in the database.

16. The system of claim 13, wherein the image forming apparatus is further configured to execute a plurality of functions including a print function, a scan function and a copy function, and wherein the authority function indicates available functions of the image forming apparatus.

17. The system of claim 16, wherein the detailed settings limit permission to execute at least one of the available functions.

* * * * *